US007788204B1

(12) United States Patent
Thomas (10) Patent No.: US 7,788,204 B1
(45) Date of Patent: Aug. 31, 2010

(54) SYSTEM AND METHOD FOR ADAPTING PROGRAM ELEMENTS BASED ON APPLICATION USAGE

(75) Inventor: Erikheath A. Thomas, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 642 days.

(21) Appl. No.: 11/741,595

(22) Filed: Apr. 27, 2007

(51) Int. Cl.
*G06N 5/00* (2006.01)
(52) U.S. Cl. .......................................... 706/47; 706/45
(58) Field of Classification Search ................... 706/45, 706/47; 718/102
See application file for complete search history.

(56) References Cited

U.S. PATENT DOCUMENTS

| 5,726,688 | A | | 3/1998 | Siefert et al. | |
|---|---|---|---|---|---|
| 5,774,357 | A | | 6/1998 | Hoffberg et al. | |
| 5,784,616 | A | * | 7/1998 | Horvitz | 718/102 |
| 5,991,735 | A | * | 11/1999 | Gerace | 705/10 |
| 5,995,997 | A | * | 11/1999 | Horvitz | 718/102 |
| 6,009,452 | A | * | 12/1999 | Horvitz | 718/102 |
| 6,021,403 | A | * | 2/2000 | Horvitz et al. | 706/45 |
| 6,633,742 | B1 | | 10/2003 | Turner et al. | |

* cited by examiner

*Primary Examiner*—Wilbert L Starks, Jr.
(74) *Attorney, Agent, or Firm*—Osha • Liang LLP (57) ABSTRACT

Various embodiments of a system and method for adapting software elements based on application usage are described. The system and method for adapting software elements based on application usage may include a knowledge component configured to determine how a user is using an interview-based application including, but not limited to, the functions of the application that the user has utilized, the content that the user has viewed, the tasks that have been performed, and the assistance that has been requested. The knowledge component may use the application usage to determine a measure of the user's knowledge of topics within an interview-based application in order to create and/or maintain a knowledge profile for the user. The knowledge component may use the user's knowledge profile to determine a knowledge deficiency that prevents the user from completing a task within the interview-based application and modify the application in order to resolve the deficiency.

15 Claims, 8 Drawing Sheets

| task 400a | task 400b | ... | task 400n |
|---|---|---|---|
| score requirement 410a | score requirement 410b | ... | score requirement 410n |

*FIG. 4A*

| provide income information | itemize mortgage interest | ... | calculate capital gains |
|---|---|---|---|
| 60 | 90 | ... | 70 |

⎫ score requirements

*FIG. 4B*

| topic 500a | topic 500b | ... | topic 500n |
|---|---|---|---|
| knowledge score 510a | knowledge score 510b | ... | knowledge score 510n |

*FIG. 5A*

| income | mortgage interest | ... | capital gains |
|---|---|---|---|
| 60 | 90 | ... | 70 |

⎫ knowledge profile

SYSTEM AND METHOD FOR ADAPTING PROGRAM ELEMENTS BASED ON APPLICATION USAGE

BACKGROUND

Typically, computer applications provide various types of help functionality to users. A common type of help functionality is accessible through help menus found in a large portion of computer applications. In many cases, this help functionality enables users to search for help topics by keyword. For example, in a word processing application, the help functionality may enable a user to search for a keyword, such as "page margins," and return help topic results to the user that pertain to the keyword, such as "how to modify page margins." This type of functionality may be useful when the user knows with which topic they require help.

Other types of help functionality require less knowledge from the user. For example, many computer applications include embedded help functionality such as help hyperlinks placed next to particular items or content within an application display. In many cases, the help hyperlinks are placed at strategic locations. For example, some applications place help hyperlinks next to items that are frequently misunderstood such that user's may simply select the help hyperlink to obtain more information about the item.

One type of application that typically includes help functionality is an interview-based application. As opposed to tool-based applications, such as word processing and spreadsheet applications, interview-based applications typically present a user with one or more interviews that includes a series of displays that ask the user to, among other things, complete tasks (e.g., provide information, answer questions, review information, and make decisions). Interview-based applications may present information to a user in a step-by-step approach such that one or more tasks are completed before the next group of tasks is presented to the user. In some cases, interview-based applications may culminate in the completion of a larger task. In this manner, interview-based applications may assist users with large and sometimes complex tasks by breaking up the task into smaller, more manageable tasks. In some cases, interview-based applications may be primarily dialogue-based applications. In other words, a large portion of the application may contain extensive dialogue between the application and the user. Additionally, in some cases, interview-based applications may be applications that are used infrequently such that users do not typically "learn" the application. Conventionally, interview-based applications do not analyze a user's access of help functionality nor alter application content in response to the user's usage of the application.

SUMMARY

Various embodiments of a system and method for adapting software elements based on application usage are described. The system and method for adapting software elements based on application usage may be implemented within an interview-based application. The system and method for adapting software elements based on application usage may include a knowledge component configured to determine how a user is using an application including, but not limited to, the functions of the application that the user has utilized, the content that the user has viewed, the tasks that have been performed, and the assistance (or help) that has been utilized.

The knowledge component may use the application usage to determine a measure of the user's knowledge of topics within an interview-based application in order to create and/or maintain a knowledge profile that indicates the user's current level of knowledge. In various embodiments, the knowledge profile may include one or more knowledge subscales each corresponding to topic or task within the interview-based application. In general, the knowledge profile may provide an up-to-date view of the user's various knowledge levels.

The knowledge component may use the user's knowledge profile to determine one or more knowledge deficiencies that prevent the user from completing a task(s) within a path of the interview-based application. In various embodiments, a rules engine may evaluate the knowledge deficiency to determine one or more modifications to perform on a path of the interview-based application. The knowledge component may modify the application (e.g., modifying the application content, navigation paths, and/or user interface) in order to enable the user to complete the path and associated task(s).

While the system and method for adapting software elements based on application usage is described herein by way of example for several embodiments and illustrative drawings, those skilled in the art will recognize that the system and method for adapting software elements based on application usage is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for adapting software elements based on application usage as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for adapting software elements based on application usage are described. The system and method for adapting software elements based on application usage may be implemented within an interview-based application. The system and method for adapting software elements based on application usage may include a knowledge component configured to determine how a user is using an application (referred to herein as "application usage") including, but not limited to, the functions of the application that the user has utilized, the content that the user has viewed, the tasks that have been performed, and the assistance (referred to herein as "help") that has been requested. The knowledge component may use the application usage to determine a measure of the user's knowledge of topics within an interview-based application in order to create and/or maintain a knowledge profile that indicates the user's current level of knowledge. The knowledge component may use the user's knowledge profile to determine a knowledge deficiency that prevents the user from completing a task within the interview-based application. The knowledge component may modify the application (e.g., modifying the application content, navigation paths, and/or user interface) in order to enable the user to complete the task.

Figure 1A:
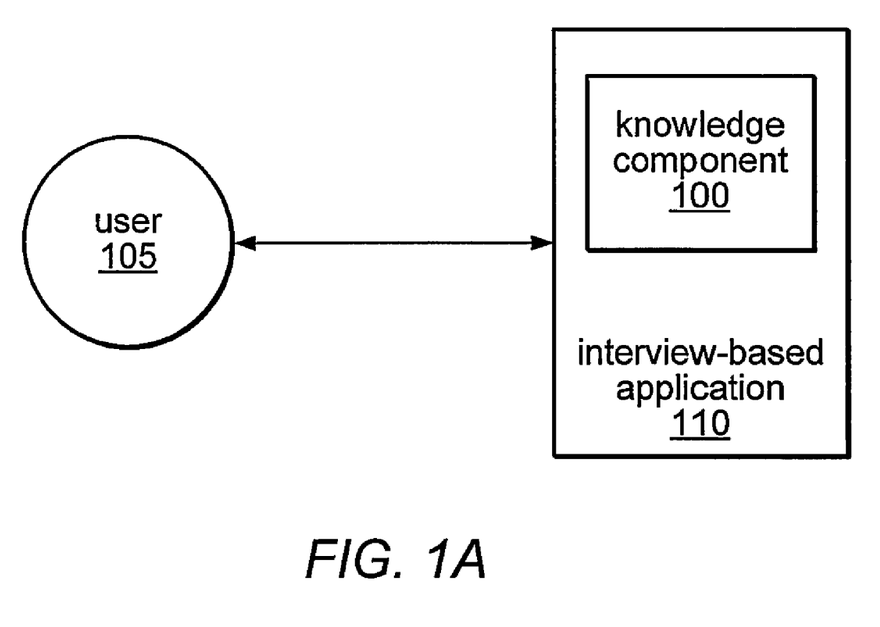
FIGS. 1A-1B are block diagrams illustrating an exemplary logical representation of an interview-based application including a knowledge component, as described herein.

An exemplary logical representation of a system and method for adapting software based application usage is illustrated by the block diagram of FIG. 1A. In various embodiments, a user, such as user 105, may interact with an interview-based application. In general, interview-based application 110 may be any of various interview-based application including, but not limited to, a tax preparation application. Once such example of an interview-based application is a tax preparation application. Tax preparation applications may ask users to complete one or more tax related tasks, such as providing income information (e.g., information from Form W-2), personal information (e.g., name, address, social security number), and deduction information (e.g., charitable contributions or donations). The tasks may be presented to the user through one or more displays that each contains some portion of the interview. Once the user has provided the necessary answers and information to complete the interview, the tax preparation application may create a tax return and, in some cases, electronically file the tax return with a taxing authority.

User 105 may interact with interview-based application 110 in order to complete one or more tasks. For example, in one embodiment, interview-based application 110 may be a tax preparation application, and the user may complete a variety of tasks (e.g., providing income information, itemizing deductions, and claiming dependents) in order to create a tax return. Knowledge component 110 may determine the user's application usage, create a knowledge profile for the user from the application usage, and adapt the interview-based application 110 in order to resolve one or more of the user's knowledge deficiencies that are preventing the user from completing one or more tasks within the interview-based application.

Figure 1B:
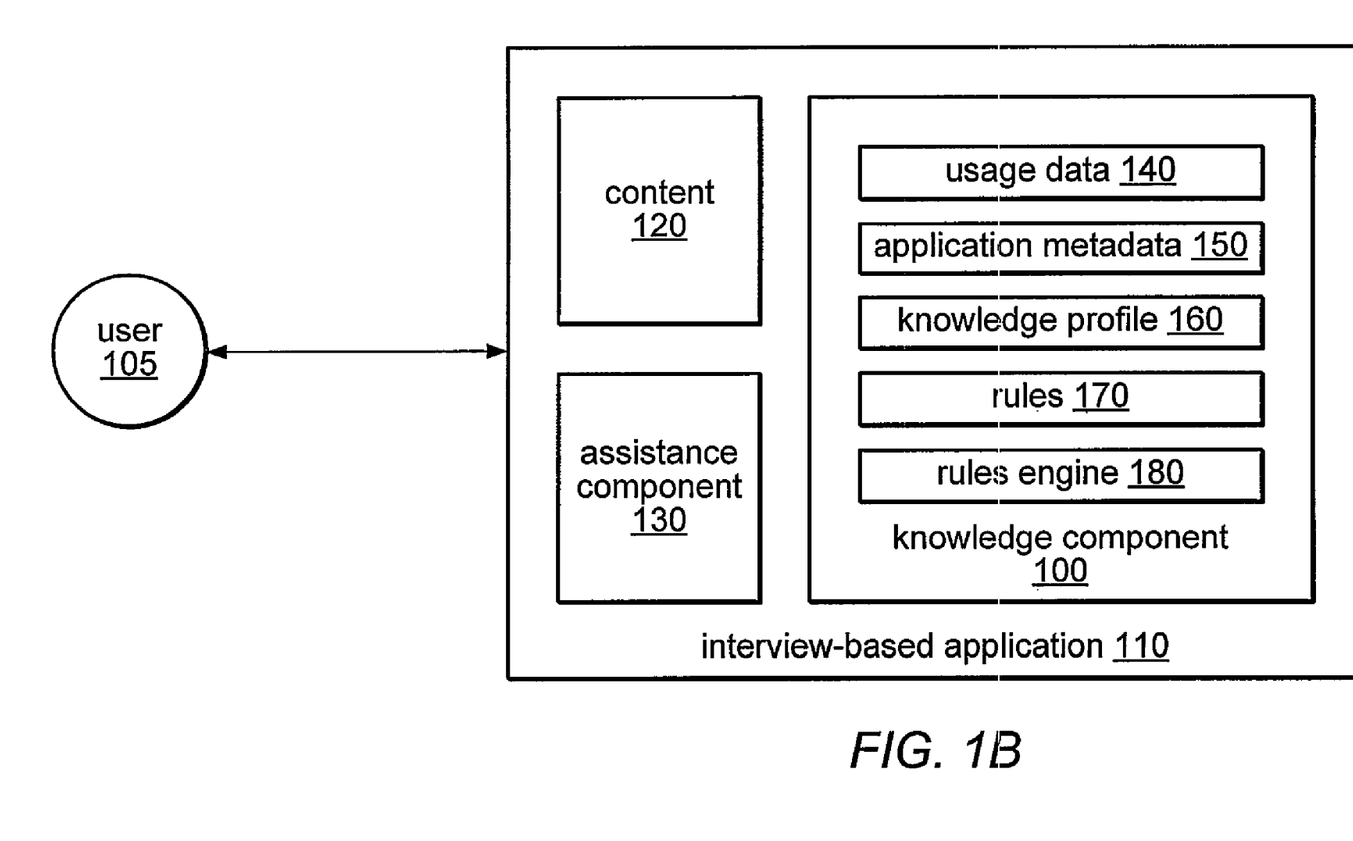

Another exemplary logical representation of a system for adapting software elements based on application usage is illustrated by the block diagram of FIG. 1B. Interview-based application 110 may be any of various interview-based applications including, but not limited to, a tax preparation application. The interview-based application may include various types of content, such as content 120. Content 120 may include the various tasks and information of interview-based application 110. For example, in some embodiments, interview-based application 110 may be a tax preparation application, and content 120 may include tax related information and tax related tasks related to reporting income, tax deductions, tax credits, tax refunds, and additional tax topics. Content 120 may also include an underlying structure to which the interview-based application adheres when presenting content to the user. In other words, content 120 may also include information that governs the organization and presentation of information and tasks to the user. For instance, in some embodiments, interview-based application 110 may be a tax preparation application, and content 120 may indicate how the various displays of the tax preparation application are to be presented to the user. For example, the first series of displays may be related to submitting personal information (e.g., name, address, Social Security Number, and other personal information) and a second series of displays may include a more advanced topic, such as submitting Form W-2 information (or other income information).

Interview-based application 110 may also include an assistance component, such as assistance component 130, which may provide help functionality to interview-based application 110. The help functionality of assistance component 130 may include a searchable index of help topics that is accessible to the user. For instance, in some embodiments, interview-based application 110 may be a tax preparation application, and the assistance component may enable the user to search for a tax related keyword, such as "deductions," and return results related to the keyword, such as results related to "deductions." The help functionality of assistance component 130 may also include "help hyperlinks," such as strategically placed (e.g., next to difficult or complex display content) hyperlinks that point to related help topics. For example, a help hyperlink may be placed near content related to home mortgage interest deductions so that users unfamiliar with home mortgage interest deductions may easily select the corresponding help hyper link to view related help information. One skilled in the art will recognize that other variations of help functionality may be employed within an interview-based application.

Interview-based application 110 may also include a knowledge component, such as knowledge component 100. The knowledge component may be configured to determine a user's actions within the application and record this information as usage data, such as usage data 140. Usage data 140 may provide an up-to-date view of the user's actions within the interview-based application including, but not limited to, the users use of assistance component 130 (which may be referred to herein as "help usage"). Usage data 140 may include records of the help topics for which the user has searched as well as when and at what point in the application the searches were performed. Usage data 140 may also include records of other help usage such as when and how the user utilized embedded help functions, such as the help hyperlinks described above. Additionally, Usage data 140 may provide an up-to-date view of the user's use of the interview within the interview-based application itself (which may be referred to herein as "interview usage"). For example, interview usage may include, but is not limited to, the status of each task completed by the user, the questions answered by the user, the decisions made by the user, and the content presented to the user. For example, usage data 140 may indicate that the user has successfully completed the submission of Form W-2 information and is currently viewing information related to education tax credits.

Figure 1C:
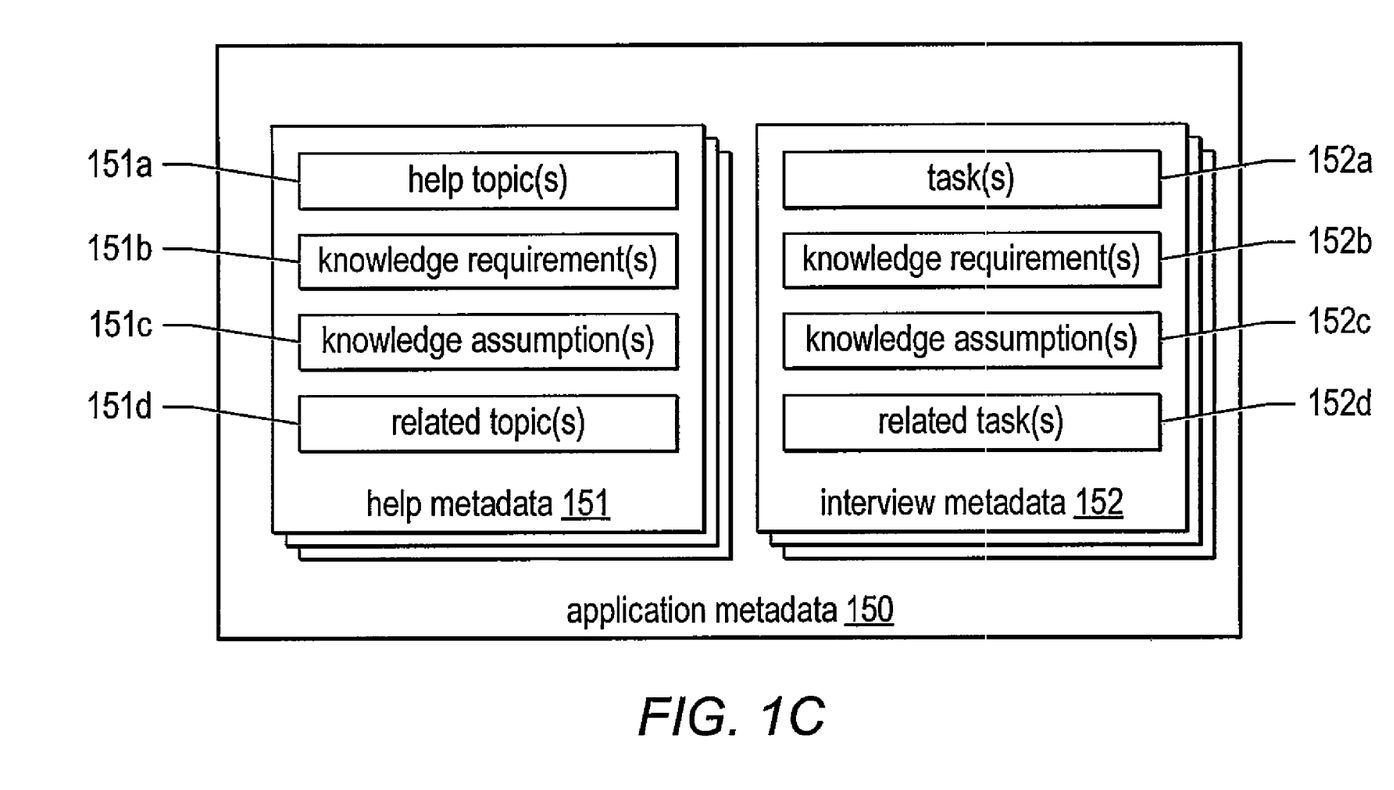
FIG. 1C illustrates an exemplary logical representation of application metadata.

Knowledge component 100 may also be configured to create and maintain application metadata, such as application metadata 150. Referring collectively to FIGS. 1B-1C, content metadata 150 may include help metadata, such as help metadata 151, and interview metadata, such as interview metadata 152. Help metadata may include a record of one or more help topics, such as help topic 151a, for which assistance component 130 is configured to provide assistance. For example, in some embodiments, interview-based application 110 may be a tax preparation application and help topic 151a may be "deductions", "refund", or any other tax topic. For each help topic, help metadata 151 may include a knowledge requirement, such as knowledge requirement 151b, a knowledge assumption, such as knowledge assumption 151c, and a record of related topics, such as related topic 151d.

The knowledge requirements, such as knowledge requirement(s) 151b, for a particular help topic may indicate the information the user needs to know in order to understand the particular help topic. For instance, if a user were to search for a particular help topic (via the assistance component), it may be presumed, in some cases, that the user does not fully understand the particular help topic. Accordingly, the knowledge requirement(s) for a particular help topic may be useful for bridging the gap between what the user already knows and what the user needs to know in order to understand the particular help topic. For example, if the help topic were "Form 1040," the knowledge requirements may include, but are not limited to, "income", "standard deductions", "adjusted gross income", and other tax topics. The knowledge assumptions, such as knowledge assumption(s) 151c, for a particular help topic may indicate information that the user likely already knows as indicated by the user searching for the particular help topic. For example, if a user is searching for a more complex topic, such as "home mortgage interest deductions", it may be assumed, in some cases, that the user already knows certain information, such as "interest", "mortgages", and other, sometimes more basic topics. For each help topic, there may be related help topics, such as the help topics indicated by related topics 151d, for which it may be assumed that the user does not fully understand. In other words, in some cases, if the user does not understand a particular help topic, such as "rental property depreciation", he may also fail to understand related topics such as "Accelerated Cost Recovery System (ACRS) depreciation method" or "Modified Accelerated Cost Recovery System (MACRS) depreciation method."

Similarly, interview metadata 152 may include a record of tasks, such as task 152a. The tasks indicated by the interview metadata may be tasks of the interview-based application. For example, in some embodiments, interview-based application 110 may be a tax preparation application, and tasks 152a may include tax related tasks, such as "submitting income information", "submitting deduction information", "quantifying charitable contributions" and other tax related tasks. For each task, interview metadata 152 may include knowledge requirements, such as knowledge requirements 152b, knowledge assumptions, such as knowledge assumptions 152c, and related tasks, such as related tasks 152d. Additionally, the knowledge requirements for a particular task may indicate what information the user needs to know in order to complete the particular task. For instance, if the particular task were "Form 1040," the knowledge requirements may include, but are not limited to, "income", "standard deductions", "adjusted gross income", and other tax topics. Furthermore, the knowledge assumptions for a particular task may indicate information that user would likely know if he completes the particular task. For example, if the particular task were "submitting dependent information" it may be appropriate, in some cases, to assume that the user understands that tax topic of dependents. Additionally, for a particular task completed by the user, there may be one or more related tasks of which it may be assumed the user has an understanding. In other words, it may be appropriate to assume, in some cases, that if the user has completed a particular task, he may also be capable of completing related tasks. For instance, if a user has completed the task of "determining home equity loan interest deductions," it may be appropriate to assume the user has familiarity with other home related deductions, such as "determining home mortgage interest deductions", "determining mortgage point deductions", and other home-related tax topics.

Figure 4A:
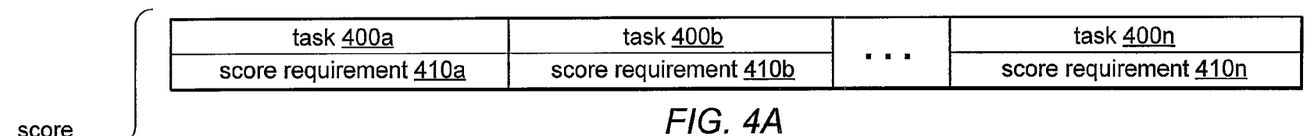
FIGS. 4A-4B illustrate an exemplary format for knowledge score requirements in an interview-based application.
Figure 4B:
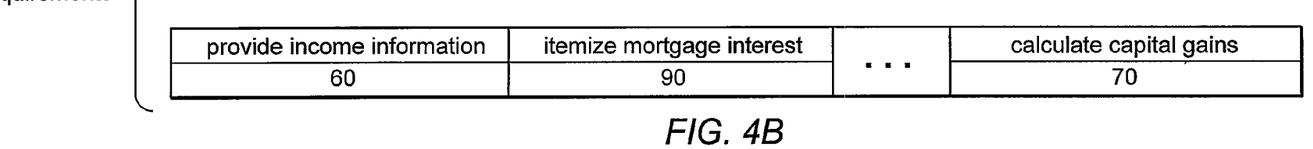

Knowledge component 100 may create and maintain a knowledge profile, such as knowledge profile 160. Knowledge profile 160 may indicate the user's current level of knowledge of information related to the interview-based application. For example, if interview-based application 110 were a tax preparation application, knowledge profile 160 may provide a measure of the user's current level of knowledge of tax preparation. Knowledge profile 160 may include one or more knowledge subscales each corresponding to a particular topic (e.g., a particular tax topic). For each knowledge subscale, the knowledge component may create and/or update a subscale score rated on a numerical scale. For example, a proficient user may have a subscale score of 90 (on a scale of 0-100) for a "deduction" subscale, which indicates the user's knowledge of tax deductions. An exemplary example of a knowledge profile is described below in regard to FIG. 4. In various embodiments, in order to create and maintain the knowledge profile, the knowledge component may determine the user's level of knowledge by analyzing the user's application usage, such as through usage data 140. Analyzing the user's application usage may include analyzing help usage and/or interview usage, such as described below.

Analyzing Help Usage

In various embodiments, the knowledge component may monitor the user's help usage, determine a change in knowledge from the help usage, and update the knowledge profile accordingly. For example, the user may search (e.g., via assistance component 130) for the help topic "home mortgage interest deduction." Knowledge component 100 may detect the user's help topic search and update knowledge profile 160 such that the knowledge profile indicates the user is lacking knowledge in "home mortgage interest deductions." For instance, the knowledge profile may have a knowledge subscale corresponding to "deductions" or "mortgage interest rate deductions," and knowledge component 160 may update the subscale to reflect the user's lack of knowledge (e.g., by lowering the subscale score).

In various embodiments, the knowledge component may also use information about the application content and assistant component, such as application metadata 150, to make further determinations about the user's level of knowledge for a particular topic and then update knowledge profile 160 accordingly. As in the example above, a user may search for a particular help topic, such as "home mortgage interest deduction." In addition to determining that the user lacks knowledge for the particular help topic, the knowledge component may also determine that the user lacks knowledge for related help topics. As described above in regard to help metadata, for each help topic, there may be related help topics, such as related topics 151d, for which it may be assumed that the user does not fully understand. Accordingly, when the knowledge component detects the user has searched for a particular help topic, the knowledge component may determine related help topics (e.g., by access related topics 151d) and update knowledge profile 160 such that knowledge profile 160 indicates a lower knowledge level for the particular help topic and the related help topics (e.g., by lowering the respective subscale scores).

Similarly, for the same help topic, the knowledge component may determine other help topics, such as help topics indicated by knowledge assumptions 151c, for which it may be assumed the user already understands. For example, if a user is searching for a more complex topic, such as "home mortgage interest deductions", it may be assumed, in some cases, that the user already knows certain information, such as "interest", "mortgages", and other, sometimes more basic topics. In other words, to understand how to ask a question about a complex topic, knowledge of more basic concepts may be necessary. Accordingly, when the knowledge component detects the user has searched for a particular help topic, the knowledge component may determine other topics, such as the topics indicated by knowledge assumptions 151*c*, and update knowledge profile 160 such that knowledge profile 160 indicates a lower knowledge level for the particular help topic and the related help topics (e.g., by lowering the respective subscale scores).

Analyzing Interview Usage

In various embodiments, the knowledge component may monitor the user's interview usage, determine a change in knowledge from the interview usage, and update the knowledge profile accordingly. For example, the user may complete a task within the interview process that relates to a particular tax topic, such as "home mortgage interest deduction." Knowledge component 100 may detect the user's task completion update knowledge profile 160 such that the knowledge profile indicates the user has sufficient knowledge in "home mortgage interest deductions." For instance, the knowledge profile may have a knowledge subscale corresponding to "deductions" or "mortgage interest rate deductions," and knowledge component 160 may update the subscale to reflect the user's knowledge (e.g., by raising the subscale score).

In various embodiments, the knowledge component may also use information about the application content and assistant component, such as application metadata 150, to make further determinations about the user's level of knowledge for a particular topic and then update knowledge profile 160 accordingly. As in the example above, a user may complete a task related to particular topic, such as "home mortgage interest deduction." In addition to determining that the user has sufficient knowledge for the particular topic, the knowledge component may also determine that the user has sufficient knowledge for related help topics. As described above in regard to interview metadata, for each interview task, there may be related tasks, such as related tasks 152*d*, for which it may be assumed that the user has sufficient knowledge to complete. Accordingly, when the knowledge component detects the user has completed a task related to a particular topic, the knowledge component may determine related tasks (e.g., by access related tasks 152*d*) and update knowledge profile 160 such that knowledge profile 160 indicates a sufficient knowledge level for the particular topic to which the related tasks are related (e.g., by raising the respective subscale scores).

Similarly, for the same task, the knowledge component may determine other tasks, such as tasks indicated by knowledge assumptions 152*c*, for which it may be assumed the user already understands. For example, if a user completes a task related to a more complex topic, such as "home mortgage interest deductions", it may be assumed, in some cases, that the user already knows certain information, such as "interest", "mortgages", and other, sometimes more basic topics. In other words, to understand how to complete a task related to a complex topic, knowledge of more basic concepts may be necessary. Accordingly, when the knowledge component detects the user has completed a task, the knowledge component may determine other tasks, such as the tasks indicated by knowledge assumptions 152*c*, and update knowledge profile 160 such that knowledge profile 160 indicates a sufficient knowledge level for the topics related to the completed task and the tasks for which it may be assumed the user already understands (e.g., by raising the respective subscale scores).

Knowledge component 100 may also include one or more rules and a rules engine, such as rules 170 and rules engine 180. Rules 170 may be configured during application development or at a later time (e.g., by an administrator). Rules engine 180 may be configured to apply rules 170 to a user's level of knowledge of particular topic, such as determined from the knowledge profile, in order to alter an element of the interview-based application, such as content 120 or assistance component 130. In general, each rule may include a condition and an associated action to be completed if the condition has been met. An exemplary rule is illustrated below:

<rule>
    <condition>
    user's knowledge score for "deductions"<70
    </condition>
    <action>
    alter interview segments related to deductions such that
        additional context information is presented to the user
    </action>
    </rule>

The exemplary rule illustrates a condition that may be placed on the user's knowledge. In this case, knowledge component 100 may test the condition by accessing knowledge profile 160 and determining the user's knowledge score for "deductions." If the user's knowledge score is less than 70, the knowledge component may alter the application (e.g., tasks, displays, help menus, and other items) such that additional context information, such as information that clearly explains what a deduction is to the user, is automatically presented to the user. In various embodiments, rules 170 may include rules for varying levels of knowledge deficiency such that stronger modifications may be made to the application when the user's knowledge deficiency is larger. Similarly, when the user's knowledge deficiency is small, a smaller modification may be made to the application. In this way, knowledge component 100 may enable the interview-based application to dynamically adjust to the user's current level of knowledge. In many cases, knowledge component may detect a deficiency in the user's knowledge, and alter the application (e.g., altering, adding or pruning navigations paths, altering help content, and providing additional content) in order to accommodate the user's deficiency such that the user may complete a task he otherwise would not have had the knowledge to complete.

Figure 2:
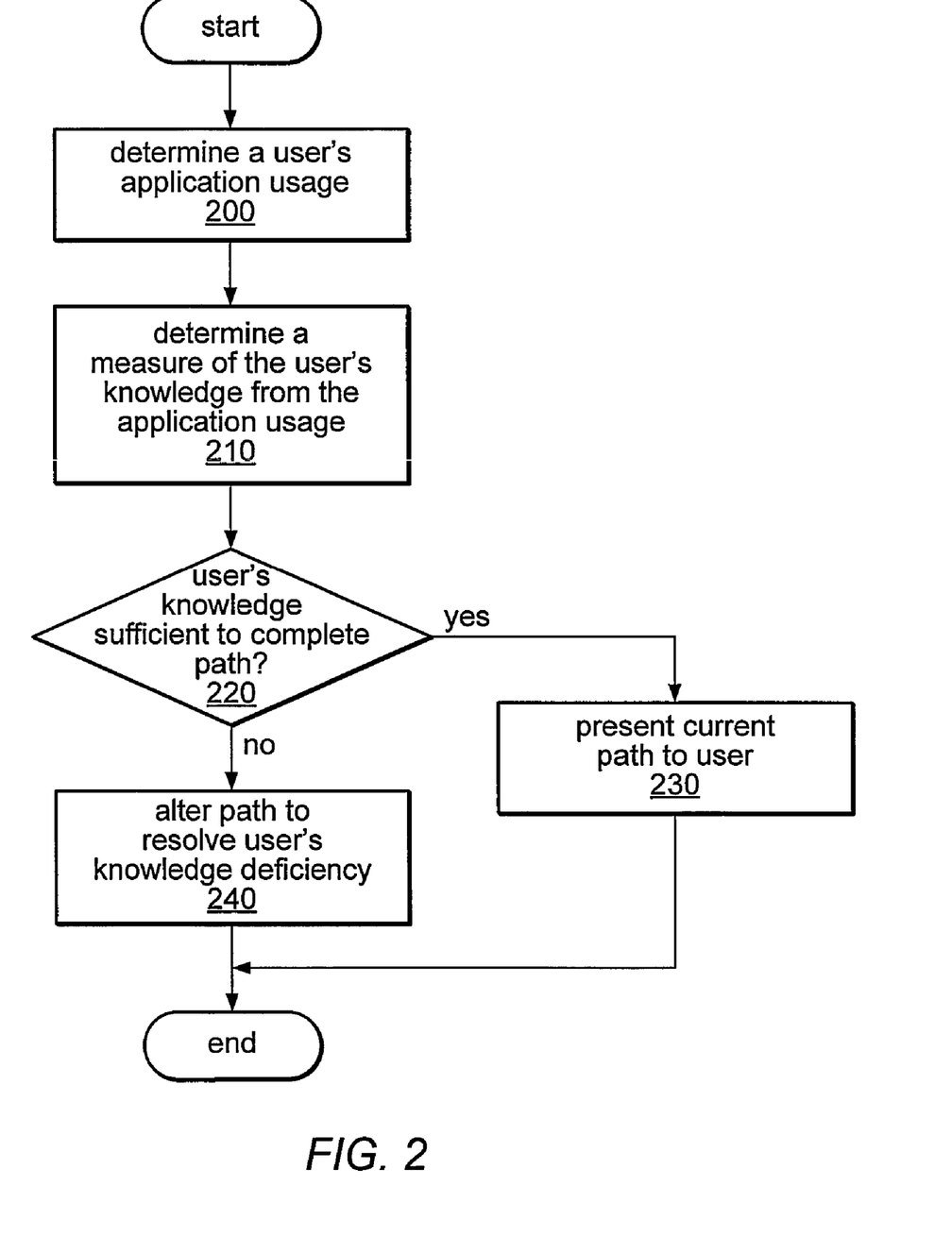
FIG. 2 is a flowchart illustrating an exemplary method for altering an element of an interview-based application.

An exemplary method of altering one or more elements of an application in response to a user's knowledge profile is illustrated by the flowchart of FIG. 2. The method described may be implemented by a knowledge component, such as knowledge component 100. As illustrated by block 200, the method may include determining a user's application usage. Application usage may include help usage (e.g., user interactions with the assistance system of the interview-based application) and interview usage (e.g., user interactions with the interview of the interview-based application). For example, determining a user's application usage may include determining the help topics for which the user has searched as well as when and at what point in the application the searches were performed. Determining the user's application usage may also include determining other help usage such as when and how the user utilized embedded help functions, such as the help hyperlinks described above. Additionally, determining the user's application usage may include determining the status of each interview task accessed by the user (e.g., complete or incomplete), the questions answered by the user, the decisions made by the user, and the content presented to the user. For example, determining the user's application usage may include determining that the user has successfully completed the submission of Form W-2 information and is currently viewing information related to education tax credits.

Figure 5A:
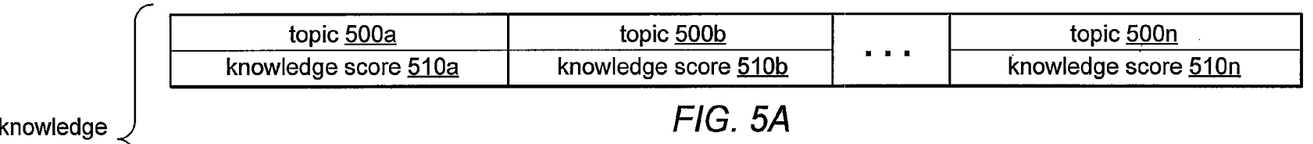
FIGS. 5A-5B illustrate an exemplary format for a knowledge profile of a user.
Figure 5B:
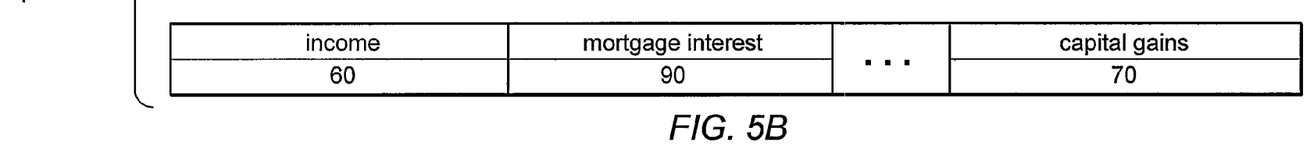

After determining application usage by the user, the method may include determining a measure of the user's knowledge, such as knowledge of one or more topics of the application, as illustrated by block 210. Determining a measure of the user's knowledge may include determining a particular help topic (e.g., "home mortgage interest deduction") accessed by the user (e.g., accessed through a search index of assistance component 130, through a help hyperlink, or other help function). Determining a measure of the user's knowledge may include modifying a knowledge profile, such as knowledge profile 100, such that the knowledge profile indicates the user does not have sufficient knowledge of the particular help topic (e.g., "home mortgage interest deduction"). For instance, one or more knowledge subscales (e.g., a knowledge subscale corresponding to "home mortgage interest deduction") may be lowered in response to the user accessing a corresponding help topic. Additionally, for each help topic accessed, determining a measure of the user's knowledge may include determining topics that the user already knows (e.g., topics the user must to know to seek the original help topic) as well as related topics, such as described above in regard to help metadata 151. Determining a measure of the user's knowledge may include modifying the knowledge profile for the related topics as well (e.g., by lowering one or more corresponding knowledge subscales). One example of a knowledge profile with variable knowledge subscales is illustrated in FIGS. 5A-5B.

In some embodiments, determining a method of the user's knowledge may include differentiating between different levels of help usage. For example, in some cases, help usage associated with search for a particular help topic may be weighted more heavily than accessing a help feature embedded within an interview display, such as a help hyperlink. For instance, in some cases, user's may access certain types of help, such as help hyperlinks and other embedded help features, in a confirmatory manner. In other words, the user may have enough knowledge to understand a particular topic (e.g., "Form 1040") yet access a help feature to merely confirm his understanding of the topic. Accordingly, this type of help usage may not negatively affect the user's knowledge level for the particular help topic (e.g., as indicated by the knowledge profile).

In addition to accessed help topics, determining a measure of the user's knowledge may include determining a particular task (e.g., providing information, answering questions, reviewing information, and making decisions) that has been completed by the user. For each interview task completed (e.g., submitting income information, itemizing deductions), determining a measure of the user's knowledge may include determining that the user has sufficient knowledge of topics related to the interview task. For example, if the user completes the task of "itemizing deductions," determining a measure of the user's knowledge may include determining that the user understands and has sufficient knowledge of "itemizing deductions." Determining a measure of the user's knowledge may include modifying a knowledge profile, such as knowledge profile 100, such that the knowledge profile indicates the user has sufficient knowledge of the particular task (e.g., "itemizing deductions"). For instance, one or more knowledge subscales (e.g., a knowledge subscale corresponding to "itemizing deductions") may be raised in response to the user completing a task corresponding to the subscale. Additionally, for each task completed, determining a measure of the user's knowledge may include determining topics that the user sufficiently understands after completing the particular tasks (e.g., topics that the user learned by completing the task) as well as related topics, such as described above in regard to interview metadata 151. Determining a measure of the user's knowledge may include modifying the knowledge profile for the related topics as well (e.g., by raising one or more corresponding knowledge subscales).

Referring collectively to FIGS. 2-6, the method may further include determining if the user's knowledge is sufficient to complete a particular navigation path of the interview-based application, as illustrated by block 230. In many cases, a navigation path of the interview-based application may include one or more displays that prompt the user to complete one or more tasks (e.g., providing information, answering questions, reviewing information, and making decisions). Each task may be associated with one or more topics. For example, in some embodiments, the interview-based application may be a tax preparation application and each path may include tasks related to preparing a tax return. Such tasks may be associated with various tax topics, such as "itemizing deductions", "home mortgage interest", or "charitable contributions." Determining if the user's knowledge is sufficient to complete a particular navigation path may include determining the score requirements for each task within the path. Score requirements may be configured and stored within the knowledge component during application development or at a later time (e.g., by an administrator). An exemplary format of score requirements is illustrated in FIGS. 4A-4B. For each task 400a-400n, there may be an associated knowledge score requirement, such as score requirements 410a-410n. Additionally, FIGS. 5A-5B illustrate an exemplary format for a knowledge profile. For each topic 500a-500n, there may be an associated knowledge score, such as knowledge scores 510a-510n, which may indicate the users current knowledge level for each topic. Accordingly, determining if the user's knowledge is sufficient to complete a particular path may include comparing the user's knowledge score(s) for each topic associated with a respective path of the task. In most cases, the topic and the task may be similar, and in some cases the same. For example the task of "submitting income information" may correspond to a topic of "submitting income information" or "income." If the user's knowledge score is greater than the corresponding score requirement for each task, it may be determined that the user may proceed with the current path as illustrated by block 230.

If, however, the user's knowledge score is less than the corresponding score requirement for any of the tasks, the current path may not be presented to the user. Instead, the method may include altering the path to resolve the user's knowledge deficiency, as illustrated by block 240. Altering the path to resolve the user's knowledge deficiency may include identifying the tasks for which the user lacks sufficient knowledge. In one embodiment, this may include identifying the corresponding topics of the user knowledge profile that have knowledge scores less than the knowledge score requirements for the respective topic. The method may further include altering the paths of the application that include content corresponding to the identified tasks and/or topics. The altered path(s) may include modified application content, help content, and/or user interface elements. For instance, in one embodiment, altered paths may include more context information, such as information described a home mortgage interest deduction, so that the user may have sufficient knowledge to complete a task of the path, such as itemizing home mortgage interest on a tax return. The altered path may include additional, modified, or pruned navigation paths. For example, in some cases, one or more user displays, tasks, and/or questions may be added, altered, or removed altogether. In various embodiments, the specific modifications that are to be made may be determined by a rules engine, such as rules engine 180, applying one or more rules, such as rules 170, in order to determine the specific modification to perform to create an altered path.

Figure 3:
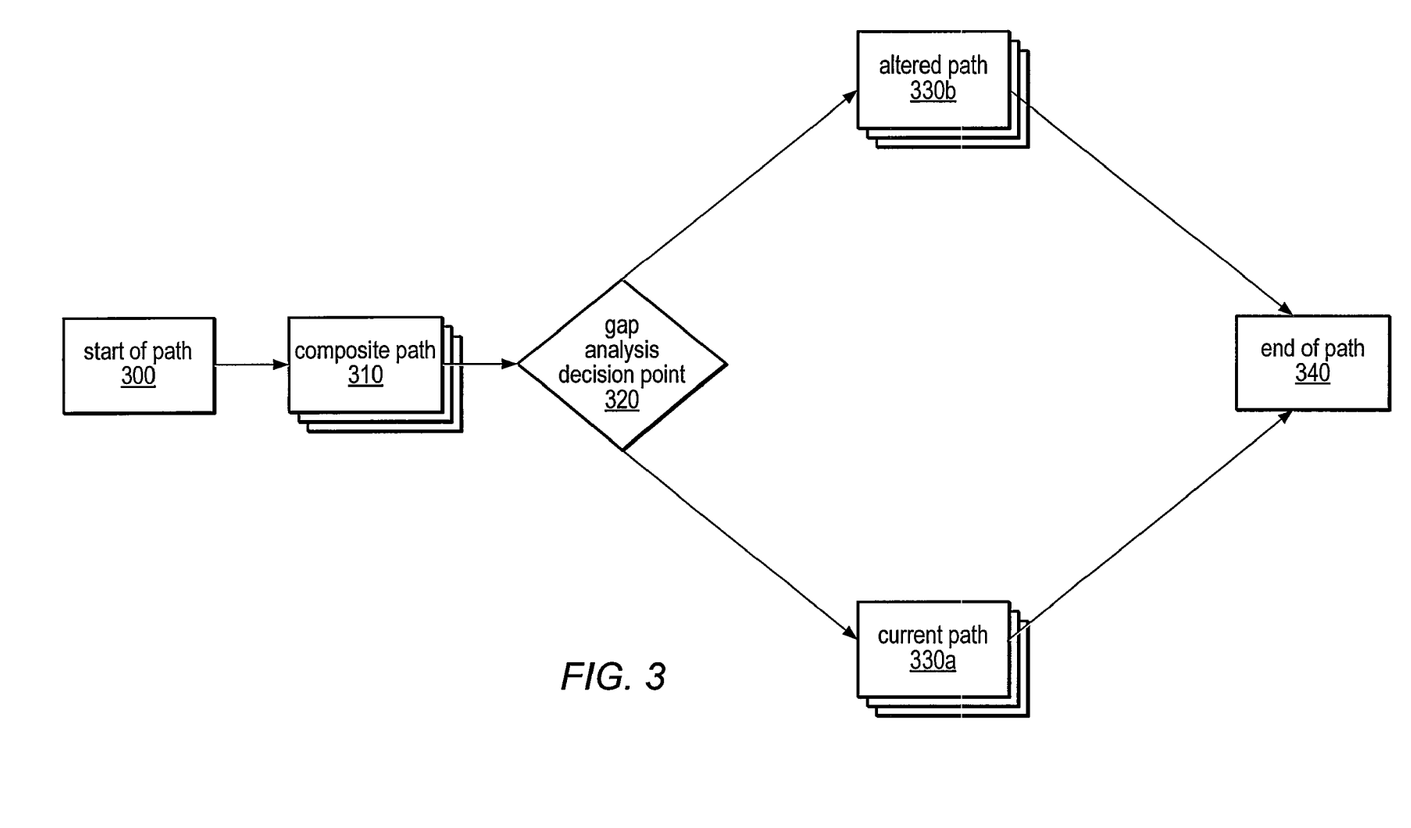
FIG. 3 is an exemplary logical representation for altering a path in an interview-based application.

A logical representation of altering an interview-based application navigation path is illustrated in FIG. 3. Each path (e.g., a series of interview displays, tasks, questions, and or information) may include a starting point, such as start of path 300, an ending point, such as ending point 340, and intermediate path segments such as composite path 310. Additionally, a path may contain a gap analysis decision point, such as gap analysis decision point 320. Gap analysis decision point may be located at any point within the path including the start of path. The gap analysis performed at block 320 may correspond to determining if the user's knowledge is sufficient to complete a particular navigation path of the interview-based application, such as indicated by block 220 of FIG. 2. When a user navigates to gap analysis decision point 320, a determination is made (e.g., by knowledge component 100) whether the user has sufficient knowledge to proceed along the current navigation path, such as current path 330*a*, which may include one or more tasks. If the user's knowledge level(s) is sufficient to complete each task, such as determined from the knowledge profile of the user, the user may proceed along current path 330*a*. If not, an altered path, such as path 330*b*, may be presented to the user. The altered path may include modified application content, help content, and/or user interface elements. For instance, in one embodiment, altered path 330*b* may include more context information, such as information described a home mortgage interest deduction, so that the user may have sufficient knowledge to complete a task of the path, such as itemizing home mortgage interest on a tax return. The altered path may include additional, modified, or pruned navigation paths. For example, in some cases, one or more user displays, tasks, and/or questions may be added, altered, or removed altogether.

Figure 6:
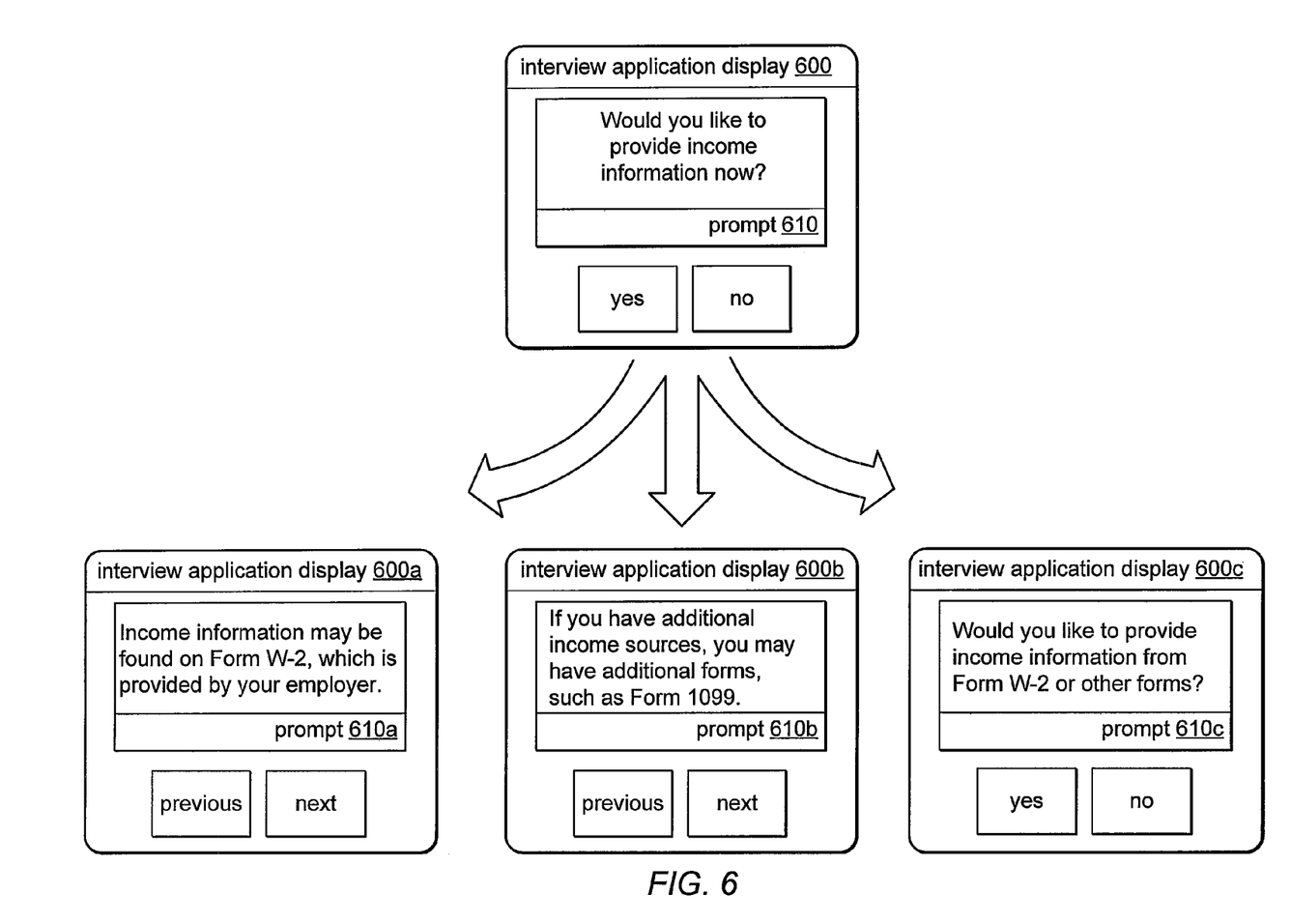
FIG. 6 illustrates an exemplary series of altered application displays in an interview-based application.

One example of an altered navigation path of in a tax preparation application is illustrated by the various displays of FIG. 6. Interview application display 600 may provide a user with a prompt, such as prompt 610, to complete a task, such as providing income information. In various embodiments, a knowledge component, such as knowledge component 100, may determine if the user has sufficient knowledge to complete the task. For example, the knowledge component may compare the user's current knowledge score to a score requirement for the particular task. If the user's current knowledge score is not sufficient, the rules engine may apply one or more rules to determine the modifications to the path in order to provide the user with sufficient knowledge to complete the task. In this example, the user may lack knowledge of income information, such as where income information is typically found. If this is the case, the rules engine may determine that the user needs additional context information, such as the particular forms where income information may be found. Accordingly, the knowledge component may alter the navigation path so that the user is presented with interview application displays 600*a*-600*c* which provide additional context information to the user in prompts 610*a*-610*c*. For example, prompt 610*a*-610*b* may inform the user that income information may be found on Form W-2 and Form 1099. In some cases, this information may increase the users level of knowledge for the topic of "submitting income." Accordingly, in many cases, the user may have sufficient knowledge to proceed with the path and complete the tasks which previously could not be completed due to lack of knowledge.

In various embodiments, the system and method for adapting software elements based on application usage may be implemented within interactive voice response applications (e.g., voice mail systems or voice driven menu systems). For example, in some cases, a knowledge component, such as knowledge component 100, may be implemented within an interactive voice response application to detect a user's level(s) of knowledge and alter elements of the interactive voice response application in response to the user's level(s) of knowledge. For instance, a knowledge component may analyze a user's navigation through an interactive voice response application and determine that the user does not understand questions presented within the interactive voice response application (e.g., the user is frequently accessing the help functionality of the interactive voice response application). In response, the knowledge component may alter content of the interactive voice response application. For instance, the knowledge component may alter voice prompts such that more context information is provided to the user.

Exemplary System

Various embodiments of a system and method for adapting software elements based on application usage, as described herein, may be executed on one or more computer systems, which may interact with various other devices. One such computer system is computer system 700 illustrated by FIG. 7. Computer system 700 may be capable of implementing a knowledge component, such as knowledge component 100, and one or more applications, such as interview-based applications. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

Figure 7:
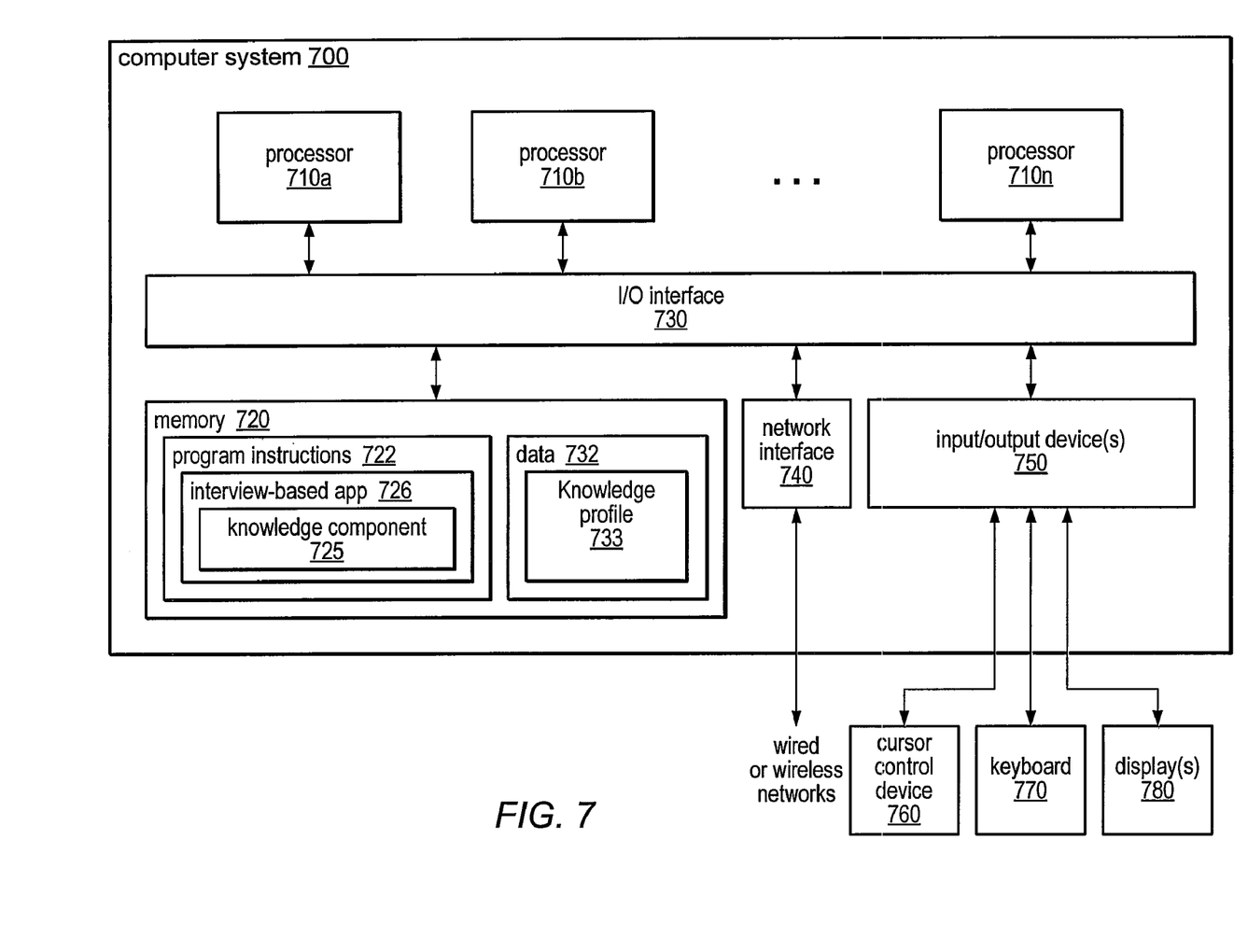
FIG. 7 illustrates a computing system suitable for implementing an interview-based application and knowledge component, according to one embodiment.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing a knowledge component and associated application, such as knowledge component 100 and interview-based application 110 described above, are shown stored within system memory 720 as knowledge component 725 and application 726, respectively. Additionally, data 732 may include one or more knowledge profiles 733, such as knowledge profile 160, and one or more application profiles, such as the application profiles described in regard to FIG. 2. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 722 configured to implement a knowledge component, such as knowledge component 100, and interview-based application 726, similar to interview-based application 110. In one embodiment, knowledge component 725 may implement the method illustrated in FIG. 2. In other embodiments, different elements and data may be included.

Those skilled in the art will appreciate that computer system 700 is merely illustrative and is not intended to limit the scope of the present invention. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The methods may be implemented in software, hardware, or a combination thereof, in different embodiments. In addition, the order of method may be changed, and various elements may be added, reordered, combined, omitted, modified, etc. Various modifications and changes may be made as would be obvious to a person skilled in the art having the benefit of this disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A system, comprising:
  a processor; and
  a memory coupled to the processor, wherein the memory comprises program instructions executable by the processor to:
    select a navigation path of an interview-based application, wherein the navigation path comprises a plurality of prompts associated with a tax topic on a tax return;
    display a prompt to a user, wherein the plurality of prompts includes the prompt
    receive, from the user and in response to displaying the prompt, a request for help associated with the tax topic;
    obtain a knowledge profile comprising a numerical knowledge subscale score, wherein the numerical knowledge subscale score is associated with the tax topic, and wherein the knowledge profile is associated with the user;
    lower, in response to the request for help associated with the tax topic, the numerical knowledge subscale score associated with the tax topic;
    select, in response to lowering the numerical knowledge subscale score, an alternate navigation path of the interview-based application, wherein the alternate path comprises an alternate plurality of prompts regarding the tax topic;
    display an alternate prompt to the user, wherein the alternate plurality of prompts includes the alternate prompt;
    receive, from the user, a value in response to displaying the alternate prompt and populate a field of the tax return based on the value.

2. The system of claim 1, wherein the program instructions are further executable to:
  determine usage, by the user, of an assistance component configured to provide help functionality.

3. The system of claim 1, wherein the program instructions are further executable to:
  identify completion of a task corresponding to the tax topic within the interview-based application; and
  increase, in response to the completion of the task, the numerical knowledge subscale score corresponding to the tax topic.

4. The system of claim 1, wherein the program instructions are further executable to:
  obtain a numerical knowledge score requirement corresponding to a task of the tax topic; and
  display an additional prompt to the user in response to the numerical knowledge score requirement exceeding the numerical knowledge subscale score.

5. The system of claim 1, wherein the program instructions are further executable to:
  obtain a numerical knowledge score requirement corresponding to a task of the tax topic; and
  display additional help content to the user in response to the numerical knowledge score requirement exceeding the numerical knowledge subscale score.

6. A computer-implemented method, comprising:
  selecting, using a processor, a navigation path of an interview-based application, wherein the navigation path comprises a plurality of prompts associated with a tax topic on a tax return;
  displaying, using the processor, a prompt to a user, wherein the plurality of prompts includes the prompt;
  receiving, from the user and in response to displaying the prompt, a request for help associated with the tax topic;
  obtaining, using the processor, a knowledge profile comprising a numerical knowledge subscale score for the tax topic, wherein the numerical knowledge subscale score is associated with the tax topic, and wherein the knowledge profile is associated with the user;
  lowering, using the processor and in response to the request for help associated with the tax topic, the numerical knowledge subscale score associated with the tax topic;
  selecting, using the processor and in response to lowering the numerical knowledge subscale score, an alternate navigation path of the interview-based application, wherein the alternate path comprises an alternate plurality of prompts regarding the tax topic;
  displaying, using the processor, an alternate prompt to the user, wherein the alternate plurality of prompts includes the alternate prompt;
  receiving, from the user and using the processor, a value in response to displaying the alternate prompt; and
  populating, using the processor, a field of the tax return based on the value.

7. The method of claim 6, further comprising:
  determining, using the processor, usage, by the user, of an assistance component configured to provide help functionality.

8. The method of claim 6, further comprising:
  identifying completion of a task corresponding to the tax topic within the interview-based application; and
  increasing, raising using the processor and in response to the completion of the task, the numerical knowledge subscale score corresponding to the tax topic.

9. The method of claim 6, further comprising:
  obtaining a numerical knowledge score requirement corresponding to a task of the tax topic; and
  displaying an additional prompt to the user in response to the numerical knowledge score requirement exceeding the numerical knowledge subscale score.

10. The method of claim 6, further comprising:
  obtaining a numerical knowledge score requirement corresponding to a task of the tax topic; and
  displaying additional help content to the user in response to the numerical knowledge score requirement exceeding the numerical knowledge subscale score.

11. A computer-readable storage medium, comprising program instructions computer-executable to implement:
  selecting a navigation path of an interview-based application, wherein the navigation path comprises a plurality of prompts associated with a tax topic on a tax return;
  displaying a prompt to a user, wherein the plurality of prompts includes the prompt;
  receiving, from the user and in response to displaying the prompt, a request for help associated with the tax topic;
  obtaining a knowledge profile comprising a numerical knowledge subscale score, wherein the numerical knowledge subscale score is associated with the tax topic, and wherein the knowledge profile is associated with the user;

lowering, in response to the request for help associated with the tax topic, the numerical knowledge subscale score associated with the tax topic;

selecting, in response to lowering the numerical knowledge subscale score, an alternate navigation path of the interview-based application, wherein the alternate path comprises an alternate plurality of prompts regarding the tax topic;

displaying an alternate prompt to the user, wherein the alternate plurality of prompts includes the prompt;

receiving, from the user, a value in response to displaying the alternate prompt; and populating a field of the tax return based on the value.

12. The computer-readable storage medium of claim 11, wherein the program instructions are further executable to implement:

determining usage, by the user, of an assistance component configured to provide help functionality.

13. The computer-readable storage medium of claim 11, wherein the program instructions are further executable to implement:

identifying completion of a task corresponding to the tax topic within the interview-based application; and increasing, in response to the user's completion of the task, the numerical knowledge subscale score corresponding to the tax topic.

14. The computer-readable storage medium of claim 11, wherein the program instructions are further executable to implement:

obtaining a numerical knowledge score requirement corresponding to a task of the tax topic; and displaying an additional prompt to the user in response to the numerical knowledge score requirement exceeding the numerical knowledge subscale score.

15. The computer-readable storage medium of claim 11, wherein the program instructions are further executable to implement:

obtaining a numerical knowledge score requirement corresponding to a task of the tax topic; and displaying additional help content to the user in response to the numerical knowledge score requirement exceeding the numerical knowledge subscale score.

* * * * *

UNITED STATES PATENT AND TRADEMARK OFFICE
CERTIFICATE OF CORRECTION

PATENT NO. : 7,788,204 B1  Page 1 of 1
APPLICATION NO. : 11/741595
DATED : August 31, 2010
INVENTOR(S) : Erikheath A. Thomas It is certified that error appears in the above-identified patent and that said Letters Patent is hereby corrected as shown below:

In Claim 8, column 16, line 41, the word "raising" should be deleted

Signed and Sealed this

Ninth Day of November, 2010

David J. Kappos
*Director of the United States Patent and Trademark Office*